(12) United States Patent
Alivisatos et al.

(10) Patent No.: US 7,303,628 B2
(45) Date of Patent: Dec. 4, 2007

(54) NANOCRYSTALS WITH LINEAR AND BRANCHED TOPOLOGY

(75) Inventors: A. Paul Alivisatos, Oakland, CA (US); Delia Milliron, Berkeley, CA (US); Liberato Manna, Lecce (IT); Steven M. Hughes, Berkeley, CA (US)

(73) Assignee: The Regents of the University of California, Oakland, CA (US)

( * ) Notice: Subject to any disclaimer, the term of this patent is extended or adjusted under 35 U.S.C. 154(b) by 355 days.

(21) Appl. No.: 10/887,013

(22) Filed: Jul. 7, 2004

(65) Prior Publication Data

US 2005/0211154 A1 Sep. 29, 2005

Related U.S. Application Data

(60) Provisional application No. 60/556,016, filed on Mar. 23, 2004.

(51) Int. Cl.
*C30B 21/02* (2006.01)
(52) U.S. Cl. .............................. 117/86; 117/87; 117/89; 117/94; 117/95
(58) Field of Classification Search .................. 117/86, 117/87, 89, 94, 95
See application file for complete search history.

(56) References Cited

U.S. PATENT DOCUMENTS 6,225,198 B1  5/2001  Alivisatos et al.
6,322,901 B1  11/2001  Bawendi et al.
6,607,829 B1  8/2003  Bawendi et al.
2004/0110002 A1  6/2004  Kim et al.
2004/0146560 A1*  7/2004  Whiteford et al. .......... 424/484

OTHER PUBLICATIONS

Milliron et al., "Colloidal Nanocrystal Heterostructures with Linear and Branched Topology," Nature Publishing Group, vol. 430, p. 190-195, (Jul. 8, 2004).
Schedelbeck et al., "Coupled Quantum Dots Fabricated by Cleaved Edge Overgrowth: From Artificial Atoms to Molecules," Science, vol. 278, p. 1792-1795, (Dec. 5, 1997).
Gudiksen et al., "Growth of Nanowire Superlattice Structures for Nanoscale Photonics and Electronics," Nature Publishing Group, vol. 415, p. 617-620, (Feb. 7, 2002).
Thelander et al., "Single-Electron Transistors in Heterostructure Nanowires," Applied Physics Letters, vol. 83 (No. 10), p. 2052-2054, (Sep. 8, 2003).
Collier et al., "Nanocrystal Superlattices," Annual Review of Physical Chemistry, vol. 49, p. 371-404, (Oct. 1998).
Ouyang et al., "Coherent Spin Transfer Between Molecularly Bridged Quantum Dots," Science, vol. 301, p. 1074-1078, (Aug. 22, 2003).

(Continued)

*Primary Examiner*—Robert Kunemund
(74) *Attorney, Agent, or Firm*—R'Sue P. Caron; Lawrence Berkeley National Laboratory (57) ABSTRACT

Disclosed herein are nanostructures comprising distinct dots and rods coupled through potential barriers of tuneable height and width, and arranged in three dimensional space at well defined angles and distances. Such control allows investigation of potential applications ranging from quantum information processing to artificial photosynthesis.

34 Claims, 10 Drawing Sheets

OTHER PUBLICATIONS

Manna et al., "Synthesis of Soluble and Processable Rod-, Arrow-, Teardrop-, and Tetrapod-Shaped CdSe Nanocrystals," Journal of the American Chemical Society, vol. 122, p. 12700-12706, (Aug. 16, 2000).

Peng et. al., "Nearly Monodisperse and Shape-Controlled CdSe Nanocrystals via Alternative Routes: Nucleation and Growth," Journal of the American Chemical Society, vol. 124, p. 3343-3353, (Oct. 17, 2001).

Manna et al., "Controlled Growth of Tetrapod-Branched Inorganic Nanocrystals," Nature Publishing Group, vol. 2, p. 382-385, (Jun. 2003).

Yeh et al., "Zinc-Blende-Wurtzite Polytypism in Semiconductors," The American Physical Society, vol. 46 (No. 16), p. 10086-10097, (Oct. 15, 1992), Phys. Rev. B.

Peng et al., "Shape Control of CdSe Nanocrystals," Nature Publishing Group, vol. 404, p. 59-61, (Mar. 2, 2000).

Manna et al., "Epitaxial Growth and Photochemical Annealing of Graded CdS/ZnS Shells on Colloidal CdSe Nanorods," Journal of the American Chemical Society, vol. 124, p. 7136-7145, (Feb. 15, 2002).

* cited by examiner

NANOCRYSTALS WITH LINEAR AND BRANCHED TOPOLOGY

PRIORITY

This application claims priority to U.S. provisional application Ser. No. 60/556,016, filed Mar. 23, 2004, the contents of which is incorporated herein by reference for all purposes.

STATEMENT AS TO RIGHTS TO INVENTIONS MADE UNDER FEDERALLY SPONSORED RESEARCH OR DEVELOPMENT

The invention described and claimed herein was made in part utilizing funds supplied by the United States Department of Energy under contract NO. DE-AC03-76SF000-98 between the United States Department of Energy and The Regents of the University of California. The government has certain rights to the invention.

BACKGROUND OF THE INVENTION

Colloidal semiconductor nanocrystals are an important field in modern nanoscale science and technology, see Bawendi, M. G.; Steigerwald, M. L.; Brus, L. E. *Annu. Rev. Phys. Chem.* 1990, 41, 477-496 and Alivisatos, A. P. *Science* 1996, 271, 933-937, the contents of both are hereby incorporated by reference in their entirety for all purposes. Among the various materials, colloidal CdSe quantum dots are undoubtedly the most studied, due to their tunable emission in the visible range, the advances in their preparation and their potential use in industrial and biomedical applications.

Recently, several advances in the synthesis of colloidal semiconductor nanocrystals have been made, allowing for size and shape control, see Peng, X. G.; Manna, L.; Yang, W. D.; Wickham, J.; Scher, E.; Kadavanich, A.; Alivisatos, A. P. *Nature* 2000, 404, 59-61 and Manna, L.; Scher, E. C.; Alivisatos, A. P. *J. Am. Chem. Soc.* 2000, 122, 12700-12706, the contents of both are hereby incorporated by reference in their entirety for all purposes. Of particular interest in this respect is the ability to obtain quantum confined wurtzite CdSe nanorods with a narrow distribution of lengths and diameters. Well-characterized samples of CdSe nanorods have become a model system to study theories of quantum confinement: for instance, it has been demonstrated, both theoretically and experimentally, that they emit linearly polarized light along the c-axis and that the degree of polarization is dependent on the aspect ratio of the particles. Semiconductor nanorods are of particular interest because of their possible applications in light emitting diodes, in low-cost photovoltaic devices, their propensity to form liquid crystalline phases and their use as barcodes for analytical purposes.

In the case of colloidal CdSe nanorods, there are two additional factors that might further reduce the luminescence from band-edge states, when compared to spherical CdSe nanocrystals. In nanorods, the surface-to-volume ratio is higher than in spheres, and this increases the occurrence of surface trap-states. In larger dots, the increased delocalization of carriers reduces the overlap of the electron and hole wavefunctions, lowering the probability of radiative recombination. The delocalization of carriers should be particularly high in a nanorod, where they are free to move throughout the length of the rod, thereby leading to reduced luminescence in nanorods. In order to efficiently and permanently remove most of the surface states of the nanocrystal, an inorganic material can be epitaxially grown on its surface, see Peng, X. G.; Schlamp, M. C.; Kadavanich, A. V.; Alivisatos, A. P. *J. Am. Chem. Soc.* 1997, 119, 7019-7029, the contents of which is hereby incorporated by reference in their entirety for all purposes.

Unlike vapor-liquid-solid (VLS) grown nanowires, anisotropic nanocrystals in homogeneous solutions grow without the benefit of catalyst activation of one end. Hence, heterostructure growth in colloidal nanocrystals has so far been limited to core/shell structures that serve primarily to further isolate quantum dots from their environment. An elegant extension of core/shell growth enabled concentric alternating layers of CdS and HgS, which have a Type I (nested) band alignment. Control over the electronic structure of concentric heterostructures is, however, restricted by their simple geometry and by strain due to lattice mismatch, which typically limits the thickness of each layer to a few monolayers or less. Heterostructures based on nanorods permit more complexity and their properties are fully tuneable since strain does not limit their dimensions. Recently, limited phase control enabled the high yield synthesis of tetrapod shaped nanocrystals of a single material, CdTe, effectively arranging four quantum rods of the same composition around a central dot, see Manna, L., Milliron, D. J., Meisel, A., Scher, E. C., Alivisatos, A. P. Controlled growth of tetrapod-branched inorganic nanocrystals. *Nature Mater.* 2, 382-385 (2003, the contents of which are hereby incorporated by reference in its entirety. This fundamental branched structure results from nucleation in the cubic zincblende phase with subsequent anisotropic growth in the hexagonal wurtzite phase.

A stringent requirement for the epitaxial growth of several monolayers of one material on the top of another is a low lattice mismatch between the two materials. If this requirement is not met, a strain accumulates in the growing layer and eventually it may be released through the formation of misfit dislocations, degrading the optical properties of the system, see for example Dabbousi, B. O.; Rodriguez Viejo, J.; Mikulec, F. V.; Heine, J. R.; Mattoussi, H.; Ober, R.; Jensen, K. F.; Bawendi, M. G. *J. Phys. Chem. B* 1997, 101, 9463-9475, the contents of which is hereby incorporated by reference in their entirety for all purposes.

Published U.S. patent application Ser. No. 20040110002 A1, the contents of which are hereby incorporated by reference in its entirety, discloses a semiconductor nanocrystal heterostructure having as its core a first semiconductor material surrounded by an over coating of a second semiconductor material.

The preparation of a coated semiconductor nanocrystal may be found in U.S. Pat. Nos. 6,607,829 and 6,322,901 the contents of which are all incorporated by reference in their entirety for all purposes. U.S. Pat. No. 6,225,198, the contents of which are hereby incorporated by reference in its entirety for all purposes discloses processes for forming Group II-VI semiconductor nanocrystals and rod-like structures by contacting the semiconductor nanocrystal precursors with a liquid media comprising a binary mixture of phosphorous-containing organic surfactants. In semiconductor quantum dots, which are nanocrystals and not the nanorods of the present invention, high emission efficiency from band-edge states is required to study in detail their electronic structure or more practically, if they are to be used as emitters in any application. Unfortunately, the band-edge emission from nanocrystals has to compete with both radiative and non-radiative decay channels, originating from surface electronic states. In colloidal nanocrystals, coating the surface of the nanocrystals with suitable organic molecules can minimize this problem. The judicious choice of a passivating agent can in fact improve the size-dependent band-edge luminescence efficiency, while preserving the solubility and processability of the particles. Unfortunately, passivation by means of organic molecules is often incomplete or reversible, exposing some regions of the surface to degradation effects such as photooxidation. In some cases, chemical degradation of the ligand molecule itself or its exchange with other ligands might lead to unstable and therefore unusable nanocrystals.

SUMMARY OF THE INVENTION

The present invention contemplates anisotropic colloidal heterostructures fabricated by sequential growth of semiconductor dots and rods of different materials, with the possibility for branched connectivity in each generation. Branching is introduced through crystal phase control. Thus, a large class of semiconductors exhibiting zincblende-wurtzite polytypism can be incorporated into branched heterostructures. The method of the present invention was developed to grow a second material selectively on the ends of nanorods and to create branch points at will.

BRIEF DESCRIPTION OF THE DRAWINGS

FIG. 4a-FIG. 4e shows high resolution transmission electron microscopy (HRTEM) of linear junctions of CdSe and CdS (a), and of CdS and CdTe (b), and a branched junction of CdS and CdTe (c) and (d).

DETAILED DESCRIPTION OF THE PREFERRED EMBODIMENTS

In one embodiment of the present invention there is disclosed a process of forming a nanocrystal heterostructure, the process comprising:

(a) providing a nanocrystal comprising a first semiconductor material and comprising a first end, and (b) forming a segment comprising a second semiconductor material extending from the first end. In one embodiment the nanocrystal is a linear nanorod with a first and a second end. In another embodiment the segment extends linearly with the first end. In another embodiment the segment extends at an angle relative to the nanocrystal. In one embodiment the angle is either about 109 or 71 degrees. In one embodiment the first semiconductor material and the second semiconductor material are selected so that, upon excitation, a first carrier is substantially confined to the nanocrystal and a second carrier is substantially confined to the segment. In another embodiment the first semiconductor material and the second semiconductor material are selected so that, upon excitation, a first and second carrier are both substantially confined to the nanocrystal. In another embodiment the nanocrystal is a tetrapod having four ends and in another embodiment there are four segments which extend linearly with the four tetrapod ends. In another embodiment each of the four segments extend at an angle relative to the tetrapod ends. In another embodiment each segment is positioned at about a 109° angle. For materials the invention contemplates that the first semiconductor material is a Group II-VI compound, a Group II-V compound, a Group III-VI compound, a Group III-V compound, a Group IV-VI compound, a Group I-III-VI compound, a Group II-IV-VI compound, or a Group II-IV-V compound. More specifically, the first semiconductor material may be chosen from ZnS, ZnSe, ZnTe, CdS, CdSe, CdTe, HgS, HgSe, HgTe, AlN, AlP, AlAs, AlSb, GaN, GaP, GaAs, GaSb, GaSe, InN, InP, InAs, InSb, TlN, TlP, TlAs, TlSb, PbS, PbSe, PbTe, or mixtures thereof. The second semiconductor material may be ZnO, ZnS, ZnSe, ZnTe, CdO, CdS, CdSe, CdTe, MgO, MgS, MgSe, MgTe, HgO, HgS, HgSe, HgTe, AlN, AlP, AlAs, AlSb, GaN, GaP, GaAs, GaSb, InN, InP, InAs, InSb, TlN, TlP, TlAs, TlSb, TlSb, PbS, PbSe, PbTe, or mixtures thereof. In yet another embodiment the first semiconductor material and the second semiconductor material are selected so that, upon excitation, a first and second carrier are both substantially confined to the segment. The invention contemplates that the nanocrystals and segmental growth are tunable by changing the diameters of the nanocrystals and segments by well known parameters known to one of ordinary skill in the art. The invention contemplates that the segment has a diameter that is smaller than the diameter of the nanocrystal and that the segment has diameter that is larger than the diameter of the nanocrystal.

In another embodiment of the present invention, there is disclosed a nanocrystal comprising a first end and comprising a first semiconductor material, and a segment comprising a second semiconductor material extending from the first end of the nanocrystal, wherein the first and second semiconductor materials are selected so that, upon excitation, a first carrier is substantially confined to the nanocrystal and a second carrier is substantially confined to the segment, or, the first and second semiconductor materials are selected so that, upon excitation, a first and second carrier are both substantially confined to the nanocrystal, or, the first and second semiconductor materials are selected so that, upon excitation, a first and second carrier are both substantially confined to the at least one segment. In one embodiment the nanocrystal is a linear nanorod with a first and a second end. In another embodiment the segment extends linearly with the first end. In another embodiment the segment extends at an angle relative to the nanocrystal. In one embodiment the angle is either about 109 or 71 degrees. In one embodiment the first semiconductor material and the second semiconductor material are selected so that, upon excitation, a first carrier is substantially confined to the nanocrystal and a second carrier is substantially confined to the segment. In another embodiment the first semiconductor material and the second semiconductor material are selected so that, upon excitation, a first and second carrier are both substantially confined to the nanocrystal. In another embodiment the nanocrystal is a tetrapod having four ends and in another embodiment there are four segments which extend linearly with the four tetrapod ends. In another embodiment each of the four segments extend at an angle relative to the tetrapod ends. In another embodiment each segment is positioned at about a 109° angle. For materials the invention contemplates that the first semiconductor material is a Group II-VI compound, a Group II-V compound, a Group III-VI compound, a Group III-V compound, a Group IV-VI compound, a Group I-III-VI compound, a Group II-IV-VI compound, or a Group II-IV-V compound. More specifically, the first semiconductor material may be chosen from ZnS, ZnSe, ZnTe, CdS, CdSe, CdTe, HgS, HgSe, HgTe, AlN, AlP, AlAs, AlSb, GaN, GaP, GaAs, GaSb, GaSe, InN, InP, InAs, InSb, TlN, TlP, TlAs, TlSb, PbS, PbSe, PbTe, or mixtures thereof. The second semiconductor material may be ZnO, ZnS, ZnSe, ZnTe, CdO, CdS, CdSe, CdTe, MgO, MgS, MgSe, MgTe, HgO, HgS, HgSe, HgTe, AlN, AlP, AlAs, AlSb, GaN, GaP, GaAs, GaSb, InN, InP, InAs, InSb, TlN, TlP, TlAs, TlSb, TlSb, PbS, PbSe, PbTe, or mixtures thereof. In yet another embodiment the first semiconductor material and the second semiconductor material are selected so that, upon excitation, a first and second carrier are both substantially confined to the segment. The invention contemplates that the nanocrystals and segmental growth are tunable by changing the diameters of the nanocrystals and segments by well known parameters known to one of ordinary skill in the art. The invention contemplates that the segment has a diameter that is smaller than the diameter of the nanocrystal and that the segment has diameter that is larger than the diameter of the nanocrystal.

Definitions

By "linearly" it is meant that the segments grown onto a nanocrystal end are in substantially the same direction as the nanocrystal end or nanocrystal branch the segment is grown onto.

By "linear" it is meant that definition normally afforded this term in the art. However, the present invention contemplates that the term "linear" as applied to nanorods, tetrapods and other nanocrystals herein means not strictly straight, or one dimensional, but much deviation is possible from the straight line that linear implies.

By "branched" it is meant that the segments grown onto a nanocrystal end or nanocrystal branch are not in linear alignment with the nanocrystal end or branch; rather they extend in a non-linear direction. Preferably the branch angle is about 109°, but this is a very rough approximation. In a Type I heterojunction, the angle may be about 71°.

By "strain and induced interfacial strain" it is meant that two different crystal structures when grown epitaxially on to of one another induce strain at the interface between them.

By "segment" it is meant that part of semiconductor material which extends longitudinally from one or both ends of a nanorod, or shaped nanorod, either linearly or at an angle.

By "heterostructure" it is meant those structures that have one semiconductor material grown into the crystal lattice of another semiconductor material.

By "providing a nanocrystal" it is meant the steps of synthesizing or any other means of furnishing a nanocrystal, including the purchase on commercial markets.

By "shaped nanorods" or "nanorods having a complex shape", it is meant to include those nanorods having other than a rod shape, such as "branched" nanorods, especially those that are the subject of U.S. Published patent application Ser. No. 20030145779 A1, filed Nov. 20, 2002, entitled "Shaped Nanocrystal Particles and Methods for Making the Same", the contents of which are incorporated herein by reference in its entirety for all purposes. These include those having shapes of tetrapods, arrow, teardrop, and rods having one, two, three or more arms of varying length.

By "nanorod" and "Semiconductor nanorod" it is meant inorganic nanorods between about 1 nm and about 1000 nm in diameter, preferably between about 2 nm and about 50 nm, more preferably about 5 nm to about 20 nm (such as about 6, 7, 8, 9, 10, 11, 12, 13, 14, 15, 16, 17, 18, 19, or 20 nm). The nanorod or nanostructure can be a semiconductor material including, but not limited to, those of the group II-VI (ZnS, ZnSe, ZnTe, CdS, CdSe, CdTe, HgS, HgSe, HgTe, MgTe and the like) and III-V (GaN, GaP, GaAs, GaSb, InN, InP, InAs, InSb, AlAs, AlP, AlSb, AlS, and the like) and IV (Ge, Si, Pb and the like) materials, and an alloy thereof, or a mixture thereof. It is also understood that the term "semiconductor nanorod" may also include those nanorods that have other than a semiconductor core, i.e. those with a metal core.

By "TOPO, TOP, TBP, HDA, HPA, ODPA and TDPA" it is meant trioctylphosphine oxide, trioctylphosphine, tri-n-butylphosphine, hexadecylamine, hexylphosphonic acid, octadecylphosphonic acid, and tetradecylphosphonic acid, respectfully.

The present invention contemplates that branched and linear junctions can be created not just at nucleation, but at any point during the growth of heterostructures. Considering two generations of growth within this paradigm, at least four basic structures are contemplated and have synthesized. In one embodiment of the present invention the first generation nanostructures can be linear, wurtzite rods, or branched tetrapods. In one embodiment, on these two basic structures, a second material is grown in either branched or linear fashion; see FIG. 1a and FIG. 1b and FIG. 2a-FIG. 2h. The dimensions of each generation define the degree of quantum confinement and are controlled by methods developed for nanorod growth. The terminal rods and dots are coupled through the tuneable barrier defined by the first generation, while more generations of growth would produce structures incorporating even more complex interactions. The present invention contemplates that two, three and four or more generations of growth be used to create heterostructures as described herein.

Long-range photoinduced charge separation has been achieved in Type II (staggered band) heterostructures, evidenced by the quenching of nanocrystal luminescence. Type I heterostructures permit tuneable exchange coupling between the terminal quantum dots or rods.

A type II semiconductor nanocrystal heterostructure has a base segment of a first semiconductor material and its ends terminated with a second semiconductor material. The first semiconductor material and second semiconductor material are selected so that, upon excitation, one carrier is substantially confined to the core and the other carrier is substantially confined to the terminal ends. In one embodiment, the conduction band of the first semiconductor material is at higher energy than the conduction band of the second semiconductor material and the valence band of the first semiconductor material is at higher energy than the valence band of the second semiconductor material. In another embodiment, the conduction band of the first semiconductor material is at lower energy than the conduction band of the second semiconductor material and the valence band of the first semiconductor material is at lower energy than the valence band of the second semiconductor material. These band alignments make spatial separation of carriers, i.e. the hole and the electron, energetically favorable upon excitation.

In one embodiment, a type I heterostructure is one in which the conduction band of the second semiconductor material is of higher energy than that of the first semiconductor material, and the valence band of the second semiconductor material is of lower energy than that of the first semiconductor material. In another embodiment, the conduction band of the second semiconductor material is of lower energy than that of the first semiconductor material, and the valence band of the second semiconductor material is of higher energy than that of the first semiconductor material. Type I heterostructure nanocrystals favor confinement of both the hole and the electron in the terminal ends.

Nanocrystals having type II heterostructures have advantageous properties that result of the spatial separation of carriers. In some nanocrystals having type II heterostructures the effective band gap, as measured by the difference in the energy of emission and energy of the lowest absorption features, can be smaller than the band gap of either of the two semiconductors making up the structure. By selecting particular first semiconductor materials and second semiconductor materials, and varying thicknesses of the semiconductor materials, nanocrystals having type II heterostructures can have emission wavelengths, such as infrared wavelengths, previously unavailable with the semiconductor of the nanocrystals in previous structures. In addition, the separation of charges in the lowest excited states of nanocrystals having type II heterostructures can make these materials more efficient in photovoltaic or photoconduction devices where the nanocrystals are chromophores and one of the carriers needs to be transported away from the excitation site prior to recombination. Separation of charges can also be useful in catalysis, where one carrier can be used to facilitate a reaction prior to recombination.

The method of the present invention was developed to grow a second material selectively on the ends of nanorods and to create branch points at will. Branching is introduced through crystal phase control; see Manna, L., Scher, E. C., and Alivisatos, A. P. Synthesis of soluble and processable rod-, arrow-, teardrop-, and tetrapod-shaped CdSe nanocrystals. *J. Am. Chem. Soc.* 122, 12700-12706 (2000) and Peng, Z. A. and Peng, X. Nearly monodisperse and shape-controlled CdSe nanocrystals via alternative routes: Nucleation and growth. *J. Am. Chem. Soc.* 124 3343-3353 (2002), the contents of both are hereby incorporated by reference in their entirety for all purposes.

In accordance with one embodiment of the present invention, first generation structures were grown by minor modifications of previously reported methods for preparing elongated nanocrystals. In a preferred embodiment, cadmium oxide complexed by alkylphosphonic acids was used as the cation precursor. The anion precursor (elemental Se, S, or Te dissolved in tri(n-alkylphosphine)) was injected at a temperature between 280 and 320° C. to initiate growth. One having ordinary skill in the art will appreciate that the parameters of temperature, solvent concentration and precursor concentration will be variable and optimizable depending on the semiconductor material being worked with.

Linear heterojunctions were formed when precursors for a second material were added to a growth solution containing preformed nanorods or tetrapods. Branched junctions were introduced preferentially at high supersaturation of these precursors. The second generation was typically grown without isolation of the nanocrystals by using an excess of cadmium in the first step and injecting the anion precursor for the second material. Linearly extended rods were synthesized with CdS rods and CdSe extensions, while the other structures were synthesized with CdSe in the first and CdTe in the second generation. Branched rods were also synthesized with CdS rods and CdTe branches. Heterostructures in accordance with the present invention are readily dispersible in common organic solvents, such as toluene and chloroform, and have been and can be prepared in high yield without any post-synthetic separation. Yields may be further improved by standard separation methods known to one having ordinary skill in the art. Similar results were achieved by isolation of the first generation nanocrystals and reintroduction of cadmium precursor prior to injecting the second anion precursor, implying extensibility to heterostructures incorporating semiconductors that do not share common ions.

Reversing the growth sequence under similar synthetic conditions changed the growth pattern of the second material from selective on the ends to more homogeneous core/shell growth. For example, growing CdTe followed by CdSe, we succeeded in synthesizing Type II core/shell tetrapods, i.e. those with a core and a shell. As observed previously for core/shell nanorods, Manna, L., Scher, E. C., Li, L. S., and Alivisatos, A. P. Epitaxial growth and photochemical annealing of graded CdS/ZnS shells on colloidal CdSe nanorods. *J. Am. Chem. Soc.* 124, 7136-7145 (2002), the contents of which are hereby incorporated by reference in its entirety, elongated growth from the ends of core/shell tetrapods proceeds only after several monolayers of shell have formed and strain limits further homogeneous growth. While not wishing to be bound by any particular theory or principle, it appears that in contrast, in branched and linear heterostructures, the difference in surface energy between two materials favors end selective growth. Thus, this invention contemplates that any pair of materials in this class, Yeh, C. Y., Lu, Z. W., Froyen, S., and Zunger, A. Zincblende-wurtzite polytypism in semiconductors. *Phys. Rev. B* 46, 10086-10097 (1992), the contents of which have been incorporated by reference in its entirety, could be combined in core-shell or in end-selective structures.

Figure 1A:
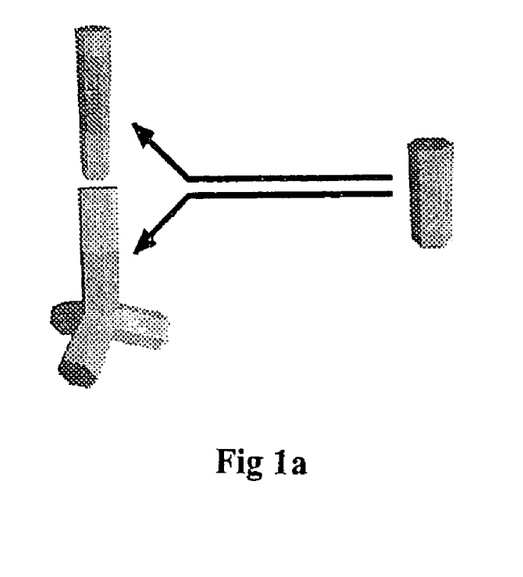
FIG. 1a shows a linear nanostructure and two embodiments of the present invention derived therefrom, a linear nanostructure terminated linearly at both ends, and a linear nanostructure terminated linearly at one end and branched at one end.
Figure 1B:
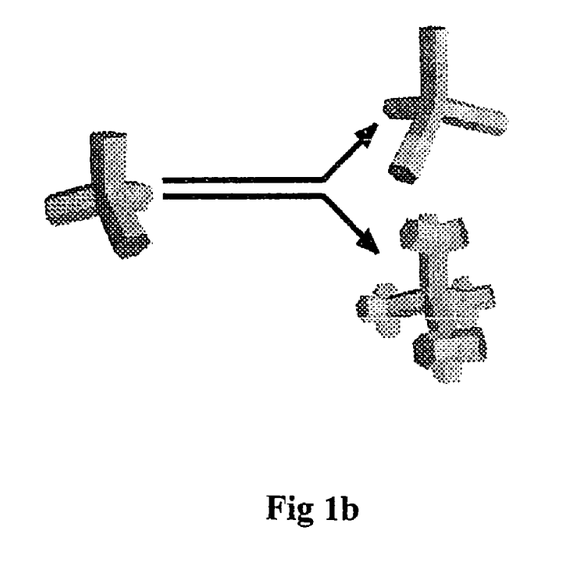
FIG. 1b shows a branched tetrapod nanostructure and two embodiments of the present invention derived therefrom, an extended tetrapod nanostructure terminated at each end with a semiconductor grown linearly, and a branched tetrapod nanostructure having branched terminal semiconductors at the ends of each branch.
Figure 2A:
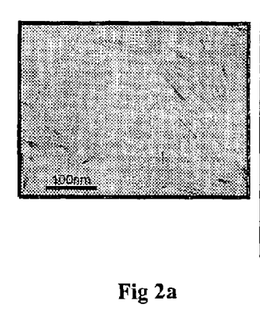
FIG. 2a shows a micrograph of nanocrystal heterostructures of extended rods of CdS on both ends of CdSe.
Figure 2B:
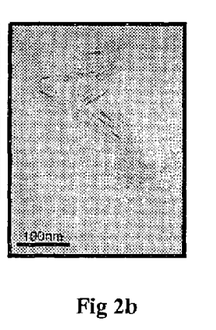
FIG. 2b shows a micrograph of linear nanorods of CdS.
Figure 2C:
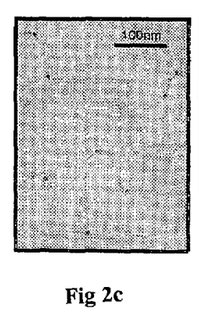
FIG. 2c shows a micrograph of nanocrystal heterostructures of CdSe tetrapods that comprise a zincblende core and four wurtzite arms.
Figure 2D:
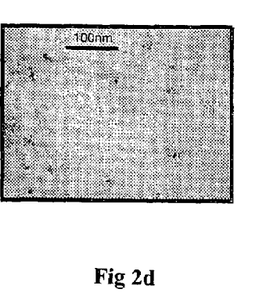
FIG. 2d shows an extended tetrapod having extending on each CdSe arm linearly with CdTe yielding extended tetrapods.
Figure 2E:
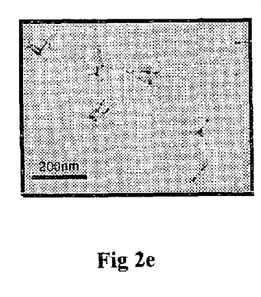
FIG. 2e shows a micrograph of branched nanocrystal heterostructures of CdTe on either end of CdSe nanorods. A CdTe zincblende region at one end creates the branch point.
Figure 2F:
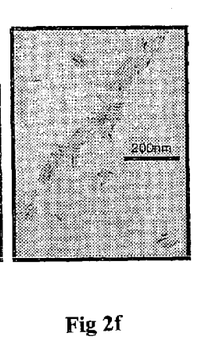
FIG. 2f shows a micrograph of linear nanorods of CdSe.
Figure 2G:
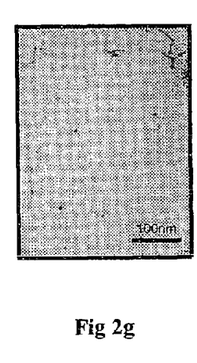
FIG. 2g shows a micrograph of nanocrystal heterostructures of CdSe tetrapods that comprise a zincblende core and four wurtzite arms.
Figure 2H:
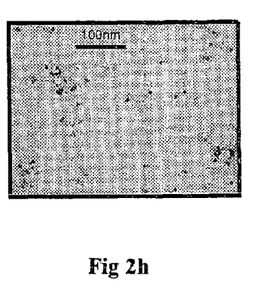
FIG. 2h shows a micrograph of branched tetrapods resulting from nucleating of CdTe zincblende branch points on the end of each CdSe arm.
Figure 3A:
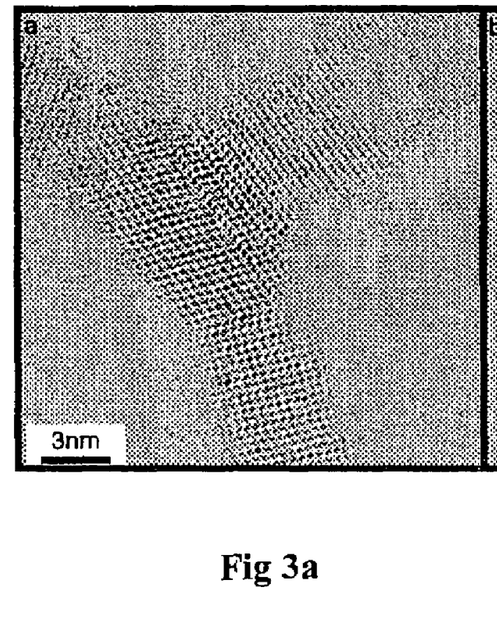
FIG. 3a shows a high resolution electron micrograph of a branch point having a zincblende core and wurtzite branches of CdTe and an original wurtzite rod (upper right) of CdSe.
Figure 3B:
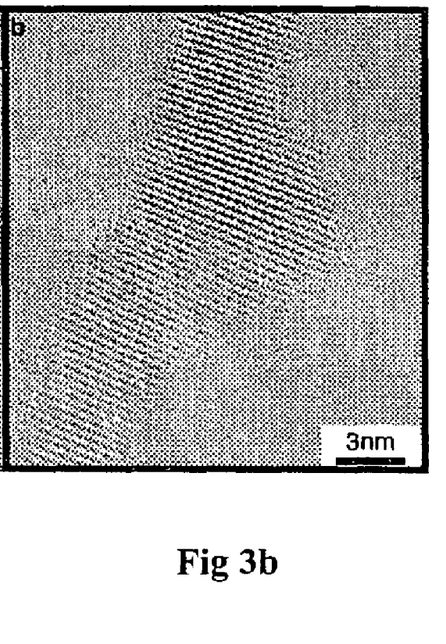
FIG. 3b shows examination of a linear junction between CdSe (upper right) and CdTe reveals continuous wurtzite growth.
Figure 4A:
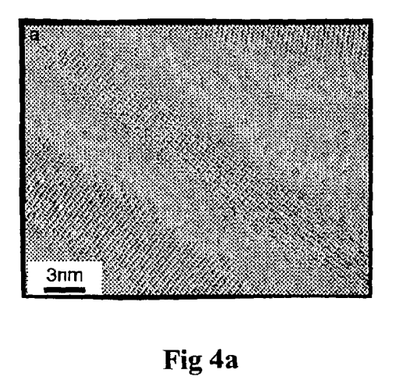
Figure 4B:
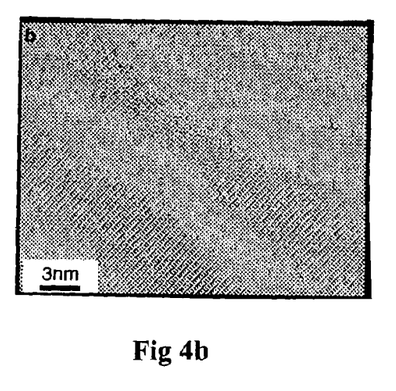
Figure 4C:
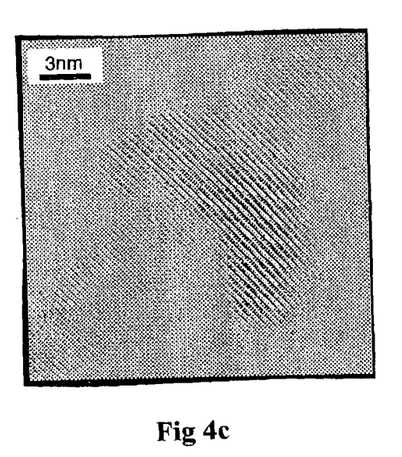
Figure 4D:
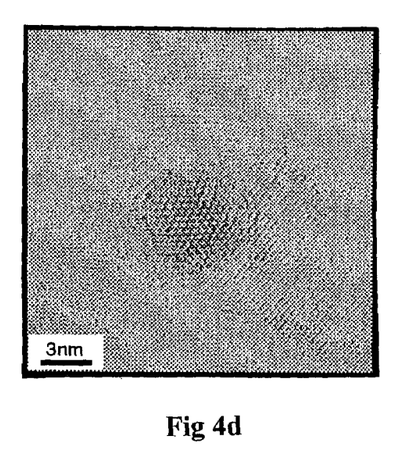

The topology of each generation is determined by the initial growth phase of the nucleating material. Nanorods and tetrapod arms grow in the wurtzite structure, elongated along the unique c-axis. Invariably, such nanocrystals contain a statistical distribution of stacking faults which convert the growth to zincblende and back to wurtzite along the rod, sometimes leading to kinks or other irregularities. High resolution transmission electron microscopy (HRTEM) of linear junctions found in extended rods and tetrapods, and in branched rods, reveals a continuation of anisotropic wurtzite growth in the second semiconductor, FIG. 3 and FIG. 4, often accompanied by a high concentration of stacking faults. At these junctions, the small diameter allows dislocation free epitaxial growth despite fairly large lattice mismatches. The heterostructures with the largest mismatch (CdS/CdTe) accommodated an 11% mismatch easily, FIG. 4. In HRTEM, branch points could most easily be observed by imaging branched rods that were missing one of the three CdTe branches, FIG. 3a and FIG. 3b. In such nanocrystals, a well formed CdTe zincblende region could be seen at the junction. Thus, a branched junction forms when the new material initially grows in the zincblende structure, followed by a reversion to anisotropic wurtzite growth, forming the branches. Zincblende formation is favoured by a high supersaturation of the precursors immediately following injection, with wurtzite growth resuming as concentrations drop.

The method described herein for synthesizing nanocrystal heterostructures can not only create solution processible analogues of nanowire heterostructures, but also enables unique functionality through the three dimensional arrangement of components. Representative heterostructures reported here incorporate either Type I or Type II interfaces to define the nature of the interactions between semiconductor materials or components.

Figure 5:
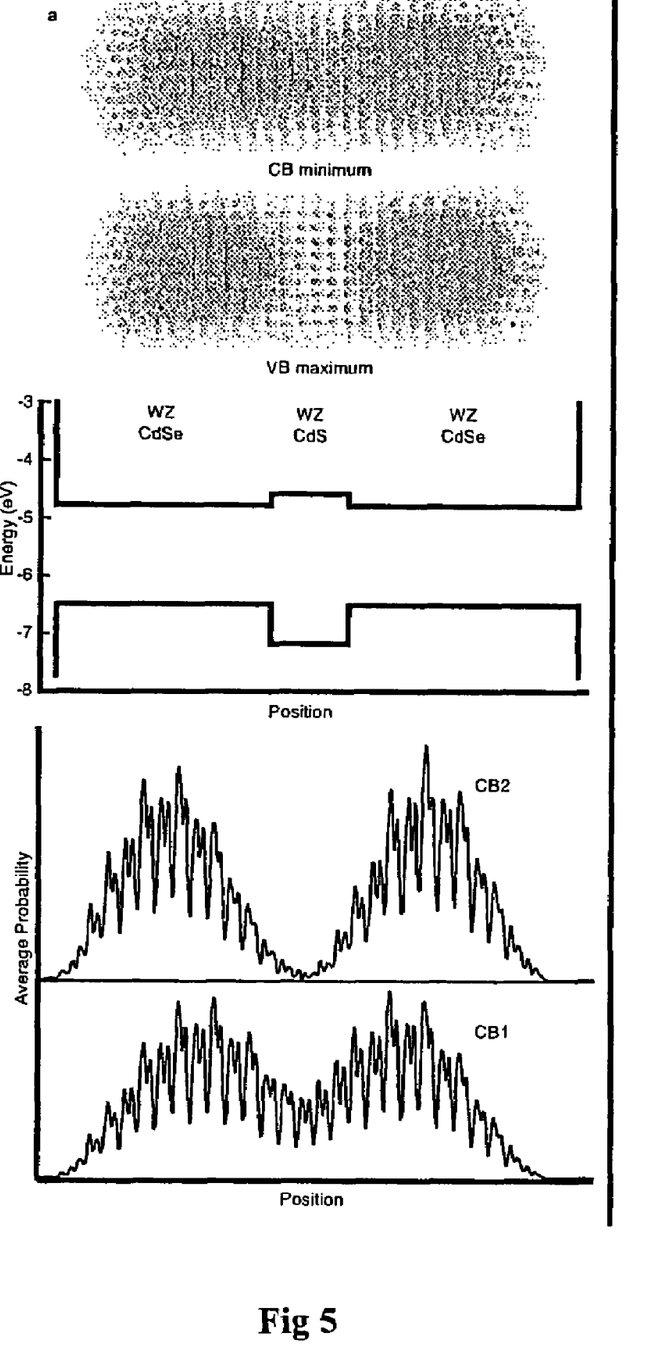
FIG. 5 shows the optoelectronic properties of Type I heterostructures. Ab initio calculation of Type I CdSe/CdS/CdSe heterostructures reveals electronic coupling.

In one embodiment, CdSe extensions grown on a CdS nanorod are quantum rods separated by a barrier for electrons and holes, see FIG. 5. The coupling of these rods is tuneable by changing the length of the original rod or of the extensions, or selecting a different material to vary the barrier height. Ab initio calculation of the electronic structure of these heterostructures confirms that the lowest energy level is split into "symmetric" and "anti-symmetric" combinations. A coupling energy of 27 meV was estimated for a heterostructure with a three monolayer CdS barrier (three layers each of Cd and S) and this coupling energy drops to 9 meV when the CdS barrier is six monolayers thick. Isosurfaces of the lowest energy electron and highest energy hole states (FIG. 5, top) show the even distribution of probability between the two terminal CdSe quantum rods. The band alignment illustrates the formation of coupled wells for electrons and holes. The cross section-averaged probability for the lowest energy conduction band state (CB1) shows significant penetration of the CdS barrier, while the next conduction band state (CB2) has a longitudinal node. The diameter of the calculated rod is about 2 nm, the total length is about 9.5 nm, and there are in total 2002 atoms. The thickness of the CdS is three monolayers. Such tuneable coupling, combined with the long spin coherence times observed in colloidal nanocrystals, make these heterostructures intriguing candidates for control of quantum coherence.

Figure 6:
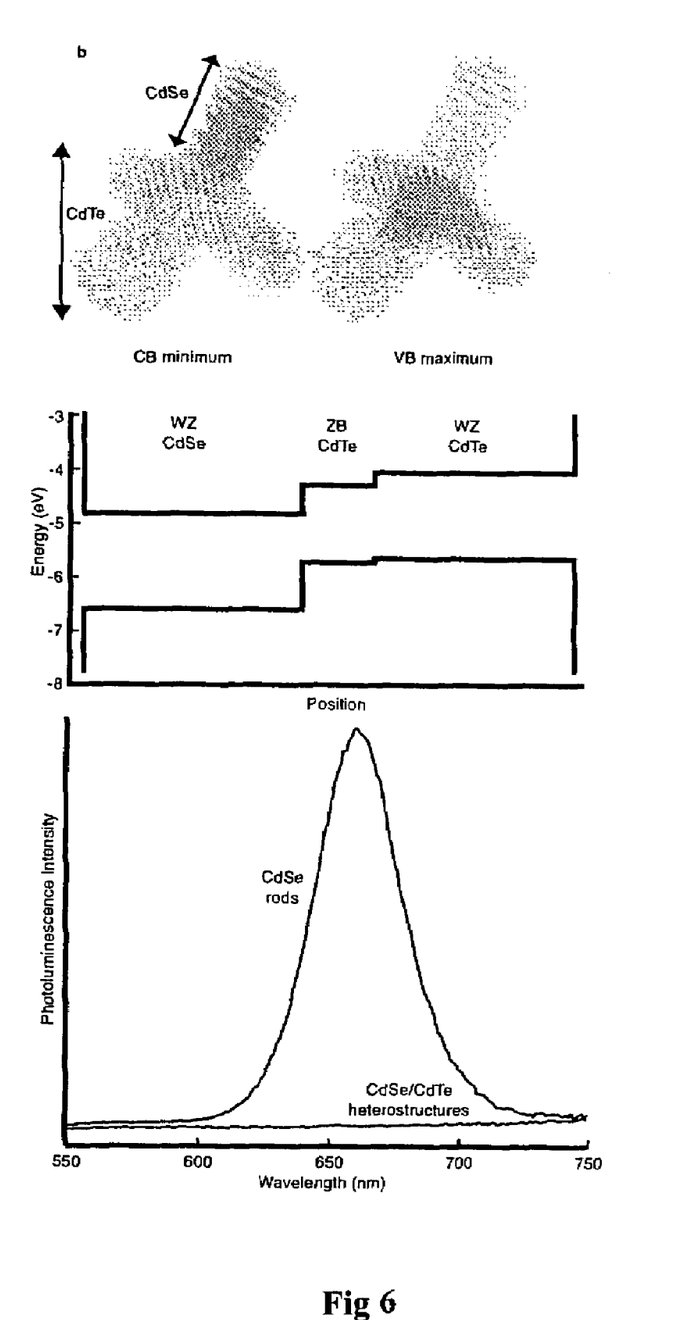
FIG. 6 shows type II CdSe/CdTe heterostructures where the electron and hole are spatially separated. Their distribution agrees qualitatively with the expected band alignment.

FIG. 6 shows type II CdSe/CdTe heterostructures where the electron and hole are spatially separated. Their distribution agrees qualitatively with the expected band alignment. The photoluminescence of CdSe rods immediately before adding CdTe branches is easily observed (bottom), while in heterostructures, charge separation strongly quenches the luminescence. For the calculated tetrapod, each branch has a diameter of 2.2 nm and a length of 4.2 nm. There are in total 3685 atoms in the tetrapod.

Branched tetrapods with CdSe central tetrapods and terminal CdTe branches are interesting for their unusual charge separating properties. These structures absorb light across the visible spectrum, then separate electrons and holes across their Type II interfaces. The sharp reduction in spatial overlap between electrons and holes, apparent in the ab initio result, effectively quenches the band gap photoluminescence, FIG. 6. Both CdSe rods and CdTe tetrapods emit well-defined band gap luminescence under similar conditions. Calculations have furthermore suggested that electrons localize in the zincblende core of CdSe tetrapods. In the heterostructured branched tetrapods this implies long range charge separation with the electron at the CdSe zincblende core and the hole delocalised in the outer CdTe branches, 30 nm or more away. This distance can be tuned by the changing dimensions of the central tetrapod.

EXAMPLES

The examples provided herein are provided as examples and not limitations, wherein a number of modifications of the exemplified process are contemplated and within the scope of the present invention.

Materials. Dimethylcadmium ($Cd(CH_3)_2$, 97%), tri-n-octylphosphine ($C_{24}H_{51}P$ or TOP) and tri-n-butylphosphine ($C_{12}H_{27}P$ or TBP, 99%) were purchased from Strem. $Cd(CH_3)_2$ was vacuum transferred and stored at $-35°$ C. under argon. Selenium (Se) (99.999%), tri-n-octylphosphine oxide ($C_{24}H_{51}OP$ or TOPO, 99%), diethylzinc ($C_4H_{10}Zn$, or $Et_2Zn$, 1.0 M solution in heptane), cadmium oxide (CdO) and hexamethyldisilathiane ($C_6H_{18}Si_2S$ or $(TMS)_2S$) were purchased from Aldrich. Hexylphosphonic acid ($C_6H_{15}O_3P$ or HPA 99%) was purchased from Organometallics Inc., tetradecylphosphonic acid ($C_{14}H_{31}O_3P$ or TDPA, 98%) was purchased from Alfa, and octadecylphosphonic acid ($C_{18}H_{39}O_3P$ or ODPA) was purchased from PolyCarbon Industries. All solvents used were anhydrous, purchased from Aldrich and used without any further purification.

Example I

Synthesis of CdSe Rods. All manipulations were performed using standard air-free techniques, unless otherwise stated. In a typical synthesis, a mixture of HPA, TDPA and TOPO was degassed at 120° C. for 1 hour in a 50 ml 3-neck flask connected to a Liebig condenser, after which 0.5 g of the Cd precursor solution was added drop wise. The resulting mixture was then heated to 360° C. and 2.5 g of the Se precursor solution was quickly injected. After injection, the temperature dropped to 290° C. and was maintained at this level throughout the synthesis. When desired, the synthesis was stopped by removing the heating mantle and by rapidly cooling the flask After cooling the solution to 50° C., 4.0 ml of methanol was added to precipitate the rods from the solution. This suspension was then transferred to a dry box, where it was centrifuged and the precipitate was washed three times with methanol. The final precipitate was then dried under Ar and stored in the dry box. Due to the high degree of uniformity of the rods that this synthesis procedure yields, no further size selective precipitation was carried out on any samples.

Example II

CdSe nanorods were prepared by dissolving 104 mg of CdO in 0.81 g of octadecylphosphonic acid and 3.19 g of tri(n-octyl)phosphine oxide at 300° C. At 280° C., 15.8 mg of selenium dissolved in 320 mg of tri(n-octyl)phosphine (TOP) were injected and the CdSe nanorods grew for four minutes. At 290° C., 34 mg of tellurium dissolved in 306 mg of TOP were injected and CdTe branches grew for six minutes before the heat was removed to stop the reaction.

Example III

CdS nanorods were prepared by dissolving 104 mg of CdO in 0.81 g of octadecylphosphonic acid and 6.5 g of tri(n-octyl)phosphine oxide at 300° C. Then, 1.5 g of tri(n-octyl)phosphine (TOP) were injected at 305° C. At 320° C., 0.3 g of sulfur precursor solution (8.2% by mass sulfur dissolved in TOP) were injected. The nanorods were allowed to grow for four minutes before the heat was removed and the nanorods washed as in example I. Then, to grow CdSe extensions linearly, forming a linear heterostructure, 104 mg of CdO in 0.81 g of octadecylphosphonic acid and 6.5 g of tri(n-octyl)phosphine oxide at 300° C. Then, 1.5 g of tri(n-octyl)phosphine (TOP) were injected at 305° C., followed by the nanorods, dispersed in toluene. At 290° C., 0.25 g of selenium precursor solution (10% by mass selenium dissolved in TOP) were injected and the heterostructures were allowed to grow for 4.5 minutes before removing the heat.

Example IV

To form heterostructures containing three generations of growth and three distinct semiconductors, the nanocrystals from example III can be washed as in example I. Then, 104 mg of CdO can be dissolved in 0.81 g of octadecylphosphonic acid and 3.19 g of tri(n-octyl)phosphine oxide at 300° C. Then, 1.5 g of tri(n-octyl)phosphine (TOP) can be injected at 305° C., followed by the nanocrystals, dispersed in toluene. At 290° C., 34 mg of tellurium dissolved in 306 mg of TOP can be injected and CdTe branches grown for six minutes before the heat is removed to stop the reaction.

The invention contemplates that branching in the second generation was and can be favored by higher concentrations of precursor and lower temperature during growth of the second semiconductor. In this way, branched or linear heterojunctions were and can be formed at will.

Characterization: Several techniques were applied to establish the end selectivity of heteroepitaxy in nanocrystal structures of the present invention. The heterostructures were deposited from solution onto carbon coated copper TEM grids for analysis. Low resolution TEM images were collected on a Philips Tecnai 12 microscope, while HRTEM employed a Philips CM300FEG/UT and a Philips Tecnai $G^2$20. EDS spectra and line scans were collected on a Philips CM200FEG STEM with a 0.5 nm spot size. Despite this spot size, the spatial resolution was limited by the drift of the instrument so that it remains unclear how compositionally abrupt the heterojunctions are.

Figure 7:
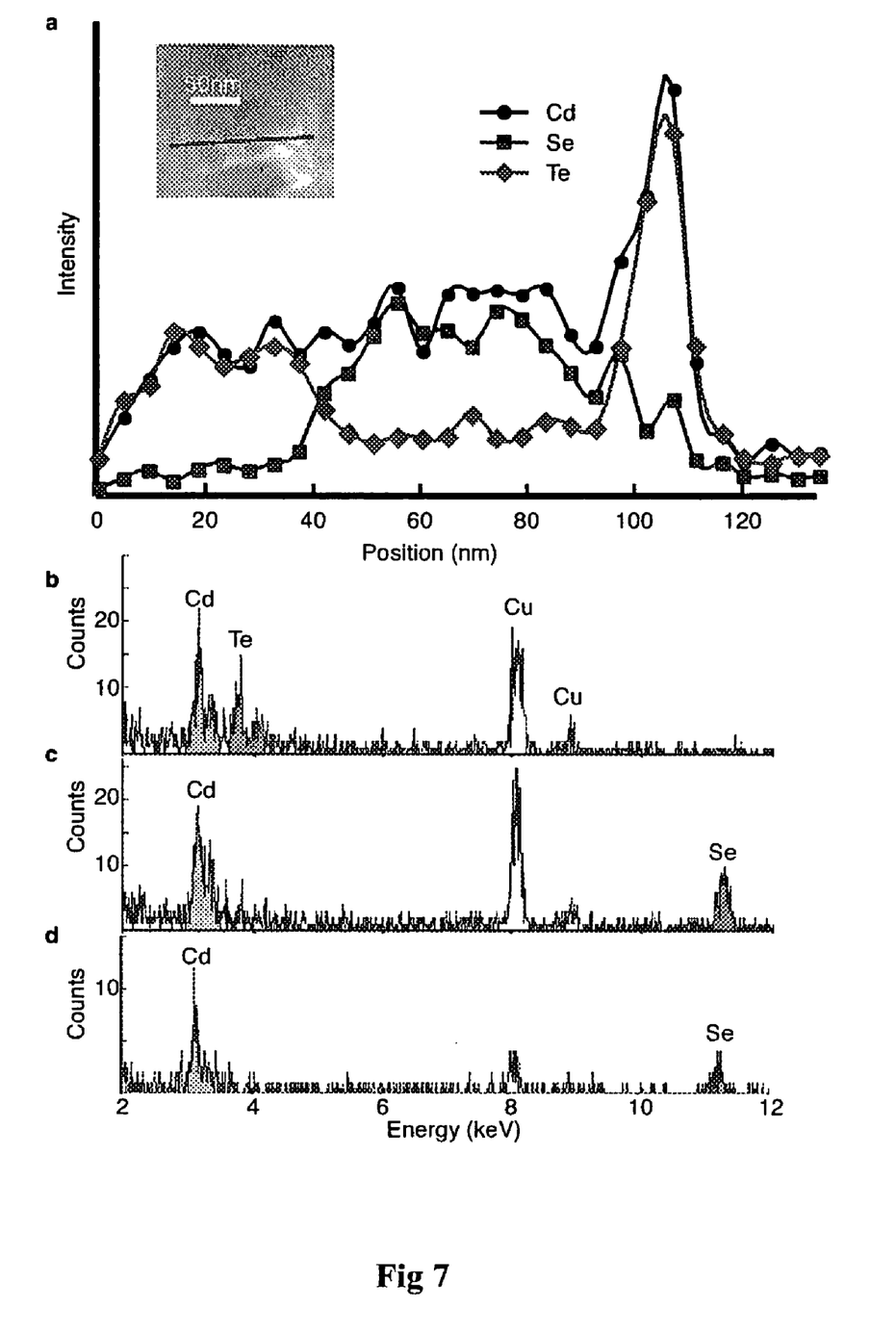
FIGS. 7a-d shows analytical electron microscopy of heterojunctions. A nanoprobe EDS line scan, a, along a branched rod (inset) confirms CdTe growth on CdSe. The high intensity spike corresponds to the CdTe arm projecting out of the plane from the branch point. While a sufficiently small spot size was used, the spatial resolution of the EDS data was limited by the drift of the instrument so that it remains uncertain how compositionally abrupt the interfaces are. Representative spectra from the CdTe portion, b, and CdSe portion, c, of the heterostructure and shown together with a spectrum of a pure CdSe rod, d.
Figure 8:
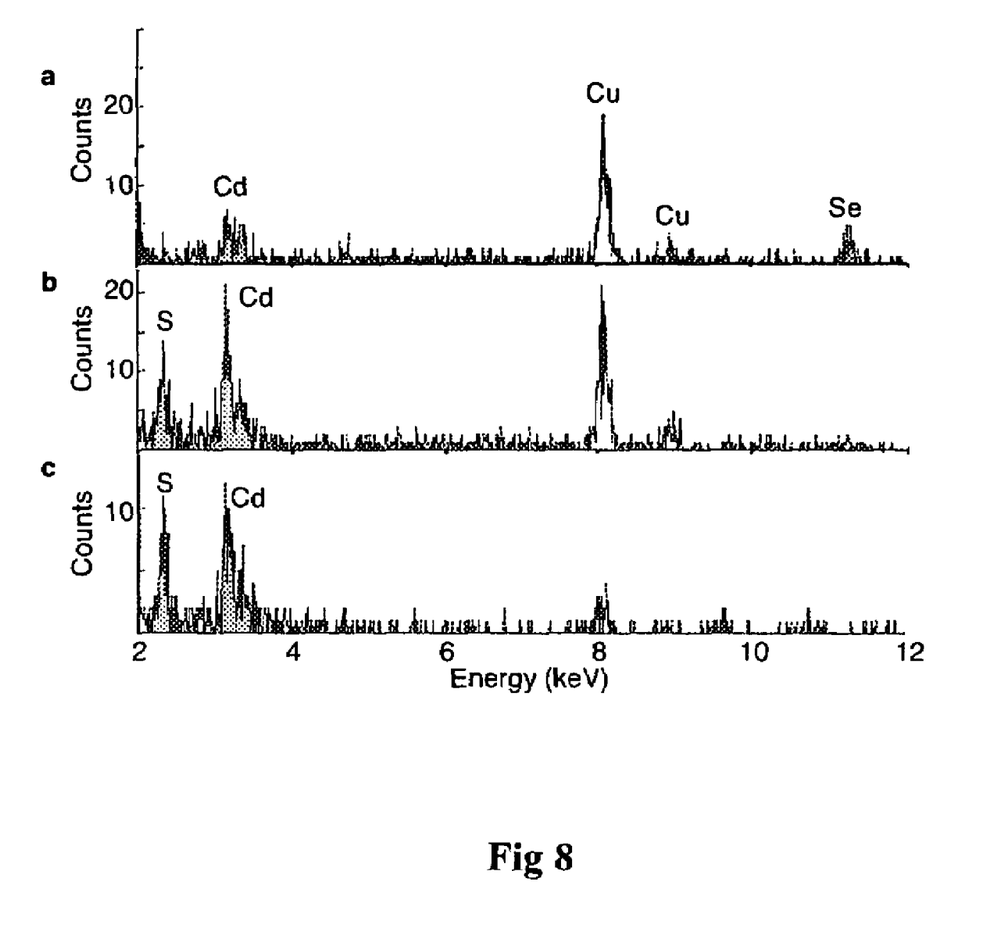
FIG. 8 shows an EDS line scan of end long growth of thinner CdSe extensions on CdS rods.
Figure 9:
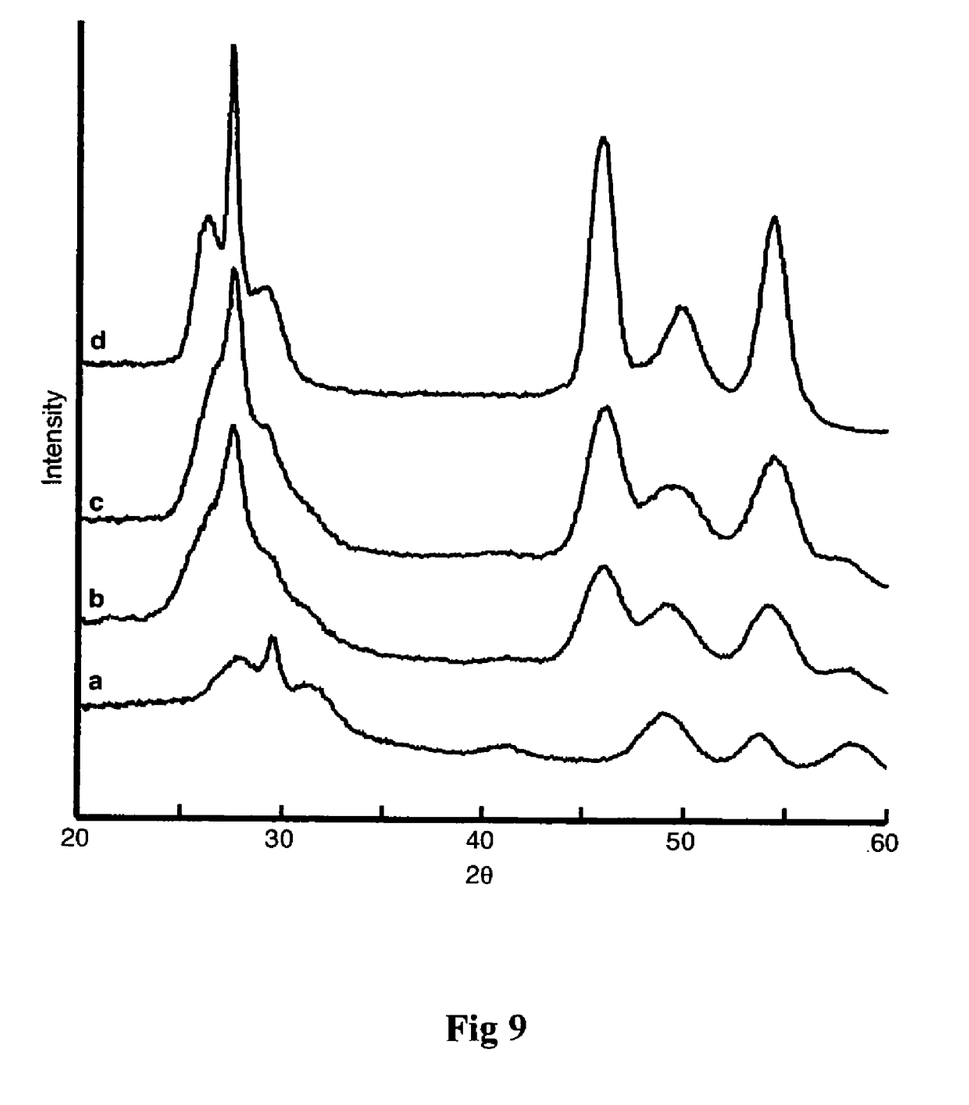
FIG. 9 shows powder x-ray diffraction patterns at different stages of heterostructure growth.
Figure 10:
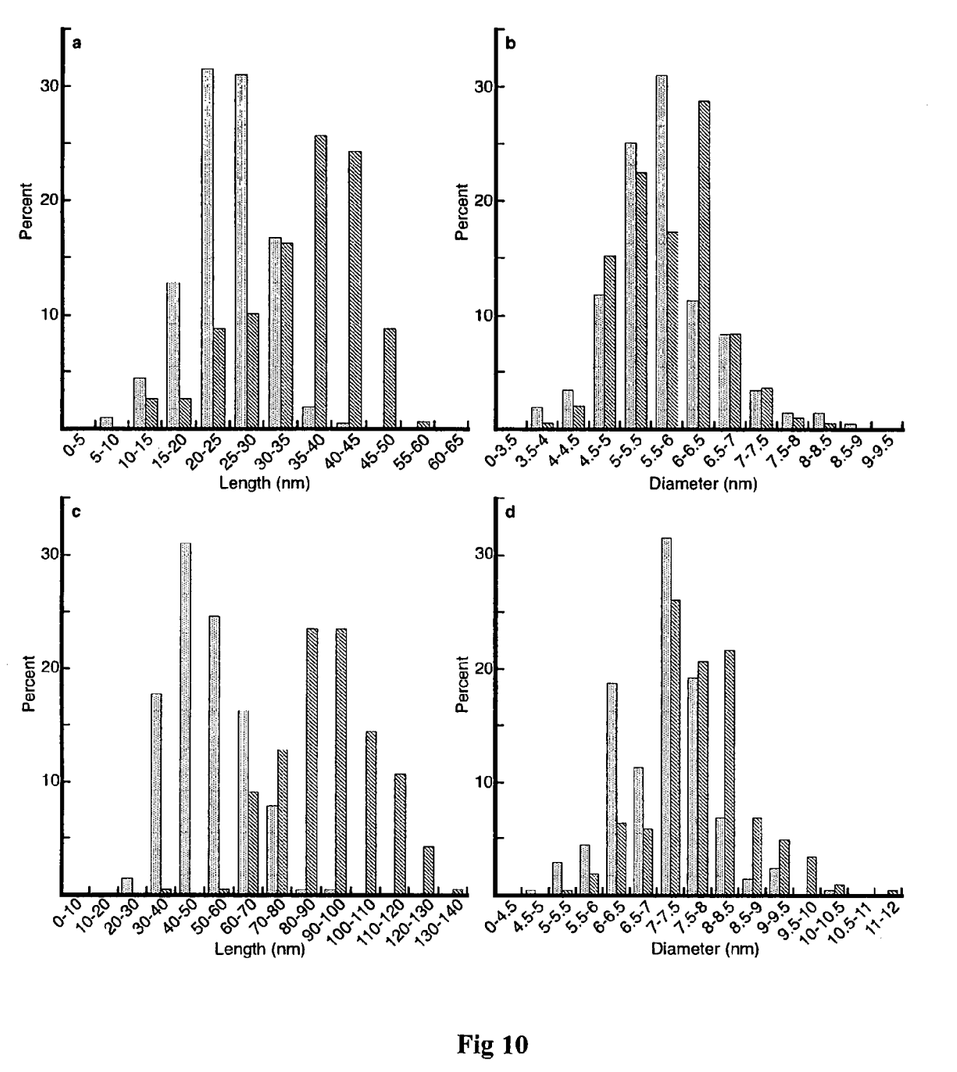
FIGS. 10a-10d shows statistical length and diameter distributions extracted from TEM images of nanorods, tetrapods, and linearly extended heterostructures based upon them.

Nanoprobe x-ray energy dispersive spectrometry (EDS) was used to examine the local atomic composition of the heterostructures. Resulting EDS line scans in FIG. 7 confirm the presence of Te at either end of branched rod heterostructures, Se in the central rod, and Cd throughout. The apparent remnant tellurium signal in the middle section is an artefact that results from partial overlap with an adjacent Cd peak and is observed in similar magnitude in CdSe nanorods containing no Te. Results on extended rods FIG. 8 similarly confirm end long growth of thinner CdSe extensions on CdS rods. The present invention contemplates that the thicknesses of the nanorods or tetrapods and the segments attached thereto have varying thicknesses. To see more clearly whether the end long growth is accompanied by the formation of a thin shell, the powder x-ray diffraction patterns at different stages of growth were examined, FIG. 9. While significant peak shifts due to strain result from the growth of shells even one monolayer thick on nanorods, we observed no obvious peak shifts. Furthermore, statistical length and diameter distributions extracted from TEM images FIG. 10 indicate no significant change in diameter upon growth of the second material. For example, the radii of the arms of one batch of CdSe tetrapods were 2.9±0.4 nm before growing CdTe extensions, and 2.9±0.5 nm afterwards. CdS nanorod radii were 3.6±0.4 nm before and 3.9±0.5 nm after growing CdSe extensions where, due to the tapered shapes of the CdS rods and of the heterostructures, the radius is taken as the maximum. The small increase in radius is consistent with the formation of at most one monolayer of CdSe on the sides of the CdS nanorods. Finally, while several of these heterostructures are Type II, their optical absorption spectra lack distinctive sub-band gap tails like those observed for Type II core/shell quantum dots and for our core/shell tetrapods.

The theoretical calculations were done using the charge patching method, Wang, L. W. Charge-density patching method for unconventional semiconductor binary systems. *Phys. Rev. Lett.* 88, 256402 (2002), the contents of which are hereby incorporated by reference in their entirety. This method calculates the band edge states of a nanosystem with ab initio accuracy, but scales linearly to the size of the system. The surface of a nanosystem is passivated with pseudo-hydrogen atoms, e.g., one pseudo-hydrogen atom with nuclear charge Z=1.5 electron for each Cd dangling bond, and Z=0.5 electron for each Se, S, or Te dangling bond. This simple model represents an ideal passivation which captures the essence of any good experimental passivations. The atomic positions of a given passivated binary semiconductor nanosystem (i.e., CdSe/CdTe, CdSe/CdS) are relaxed using the valence force field (VFF) method. This atomistic method describes the elastic aspects of the system accurately. After the atomic positions of a given system are determined, small prototype systems are precalculated under the local density approximation (LDA) of the density functional theory. The charge densities of these small prototype systems are used to generate localized charge motifs around each atom. The charge motifs for bulk Cd, Se, Te, S atoms and surface pseudo-hydrogen atoms, and the derivatives of these charge motifs regarding the change of bond lengths and bond angles are all generated. Then, these charge motifs and their derivatives are placed together to generate the LDA charge density of a given nanosystem. The typical error of the so generated charge density compared to the directly calculated charge density under LDA is about 1%. The resulting eigenstate error is about 20-40 meV. The energy splittings between states within the conduction or valence band have typical errors of a few meV. After the charge density is obtained, LDA formulae are used to calculate the LDA total potential and the LDA Hamiltonian. Then the folded spectrum method, Wang, L. W. and Zunger, A. Solving Schrödinger's equation around a desired energy: Application to silicon quantum dots. *J. Chem. Phys.* 100, 2394-2397 (1994) and Canning, A., Wang, L. W., Williamson, A., and Zunger, A. Parallel empirical pseudopotential electronic structure calculations for million atom systems. *J. Comp. Phys.* 160, 29-41 (2000), the contents of both are hereby incorporated by reference in their entirey, is used to calculate the band edge states. Under this procedure, the ab initio accuracy band edge states of a thousand atom nanosystem can be calculated within a few hours on a parallel computer. To calculate coupling energies, a small external electrical field was applied to cancel the permanent dipole of the nanorod. The diameter of the calculated rod shown in FIG. 5 is about 2 nm, the total length is about 9.5 nm, and there are in total 2002 atoms. For the calculated tetrapod in FIG. 6, each branch has a diameter of 2.2 nm and a length of 4.2 nm. There are in total 3685 atoms in the tetrapod.

The terms and expressions which have been employed herein are used as terms of description and not of limitation, and there is no intention in the use of such terms and expressions of excluding equivalents of the features shown and described, or portions thereof, it being recognized that various modifications are possible within the scope of the invention claimed. Moreover, any one or more features of any embodiment of the invention may be combined with any one or more other features of any other embodiment of the invention, without departing from the scope of the invention.

All patents, patent applications, and publications mentioned above are herein incorporated by reference in their entirety for all purposes. None of the patents, patent applications, and publications mentioned above are admitted to be prior art.

What is claimed is:

1. A process of forming a nanocrystal heterostructure, the process comprising:
   (a) providing a nanocrystal comprising a first semiconductor material and comprising a first end, and
   (b) forming a segment comprising a second semiconductor material extending epitaxially from the first end to form a nanocrystal heterostructure.

2. The process of claim 1, wherein the nanocrystal is a linear nanorod with a first and a second end.

3. The process of claim 2, wherein the segment extends linearly with the first end.

4. The process of claim 2, wherein the segment extends at an angle relative to the nanocrystal.

5. The process of claim 4, wherein the angle is about 109°.

6. The process of claim 1, wherein the first semiconductor material and the second semiconductor material are selected so that, upon excitation, a first carrier is substantially confined to the nanocrystal and a second carrier is substantially confined to the segment.

7. The process of claim 1, wherein the first semiconductor material and the second semiconductor material are selected so that, upon excitation, a first and second carrier are both substantially confined to the nanocrystal.

8. The process of claim 1, wherein the nanocrystal is a tetrapod having four ends.

9. The process of claim 8, wherein four segments extend linearly with the four tetrapod ends.

10. The process of claim 8, wherein each of the four segments extend at an angle relative to the tetrapod ends.

11. The process of claim 10, wherein each segment is positioned at about a 109° angle.

12. The process of claim 1, wherein the first semiconductor material is a Group II-VI compound, a Group II-V compound, a Group III-VI compound, a Group III-V compound, a Group IV-VI compound, a Group I-III-VI compound, a Group II-IV-VI compound, or a Group II-IV-V compound.

13. The process of claim 1, wherein the first semiconductor material comprises CdS.

14. The process of claim 1, wherein the second semiconductor material is a Group II-VI compound, a Group II-V compound, a Group III-VI compound, a Group III-V compound, a Group IV-VI compound, a Group I-III-VI compound, a Group II-IV-VI compound, or a Group II-IV-V compound.

15. The process of claim 1, wherein the second semiconductor material is CdTe.

16. The process of claim 1, wherein the first semiconductor material and the second semiconductor material are selected so that, upon excitation, a first and second carrier are both substantially confined to the segment.

17. The process of claim 1, wherein the segment has a diameter that is smaller than the diameter of the nanocrystal.

18. The process of claim 1, wherein the segment has diameter that is larger than the diameter of the nanocrystal.

19. The process of claim 1, wherein the first semiconductor material comprises CdSe and the second semiconductor material comprises CdTe.

20. A nanocrystal heterostructure, comprising:
   a nanocrystal comprising a first end and comprising a first semiconductor material; and
   a segment comprising a second semiconductor material extending epitaxially from the first end of the nanocrystal to form a nanocrystal heterostructure;
   wherein:
   the first and second semiconductor materials are selected so that, upon excitation, a first carrier is substantially confined to the nanocrystal and a second carrier is substantially confined to the segment, or,
   the first and second semiconductor materials are selected so that, upon excitation, a first and second carrier are both substantially confined to the nanocrystal, or,
   the first and second semiconductor materials are selected so that, upon excitation, a first and second carrier are both substantially confined to the at least one segment.

21. The nanocrystal heterostructure as claimed in claim 20, wherein the nanocrystal is a linear nanorod with two ends.

22. The nanocrystal heterostructure as claimed in claim 21, the segment extends linearly with the first end.

23. The nanocrystal heterostructure as claimed in claim 21, the segment extends at an angle to the nanocrystal.

24. The nanocrystal heterostructure as claimed in claim 23, the angle is about 109°.

25. The nanocrystal heterostructure as claimed in claim 20, the nanocrystal is a tetrapod having four ends.

26. The nanocrystal heterostructure as claimed in claim 25, four segments extend linearly with the four tetrapod ends.

27. The nanocrystal heterostructure as claimed in claim 25, four segments extend at an angle relative to the nanocrystal.

28. The nanocrystal heterostructure as claimed in claim 27, the angle is about 109°.

29. The nanocrystal heterostructure as claimed in claim 20, the first semiconductor material is a Group II-VI compound, a Group II-V compound, a Group III-VI compound, a Group III-V compound, a Group IV-VI compound, a Group I-III-VI compound, a Group II-IV-VI compound, or a Group II-IV-V compound.

30. The nanocrystal heterostructure as claimed in claim 20, the first semiconductor material comprises CdS.

31. The nanocrystal heterostructure as claimed in claim 20, the second semiconductor material is a Group II-VI compound, a Group II-V compound, a Group III-VI compound, a Group III-V compound, a Group IV-VI compound, a Group I-III-VI compound, a Group II-IV-VI compound, or a Group II-IV-V compound.

32. The nanocrystal heterostructure as claimed in claim 20, the second semiconductor material comprises CdTe.

33. The nanocrystal heterostructure as claimed in claim 20, the segment has a diameter that is smaller than the diameter of the nanocrystal.

34. The nanocrystal heterostructure as claimed in claim 20, the segment has a diameter that is larger than the diameter of the nanocrystal.

* * * * *